United States Patent
New et al.

(10) Patent No.: US 7,191,342 B1
(45) Date of Patent: Mar. 13, 2007

(54) METHODS AND CIRCUITS FOR ALLOWING ENCRYPTED AND UNENCRYPTED CONFIGURATION DATA TO SHARE CONFIGURATION FRAMES

(75) Inventors: Bernard J. New, Carmel Valley, CA (US); William S. Carter, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 932 days.

(21) Appl. No.: 10/163,152

(22) Filed: Jun. 4, 2002

(51) Int. Cl.
- H04L 9/12 (2006.01)
- G06F 9/40 (2006.01)
- G06F 9/445 (2006.01)
- G06F 9/46 (2006.01)

(52) U.S. Cl. .................. 713/190; 713/189; 713/165
(58) Field of Classification Search ............... 713/165, 713/189–90, 190
See application file for complete search history.

(56) References Cited

U.S. PATENT DOCUMENTS

| | | | |
|---|---|---|---|
| 5,269,010 A * | 12/1993 | MacDonald ............. 711/5 |
| 5,371,422 A * | 12/1994 | Patel et al. ............. 326/41 |
| 5,548,228 A * | 8/1996 | Madurawe ............. 326/41 |
| 5,630,154 A * | 5/1997 | Bolstad et al. ............. 712/19 |
| 5,796,829 A * | 8/1998 | Newby et al. ............. 705/54 |
| 5,915,017 A * | 6/1999 | Sung et al. ............. 713/187 |
| 5,933,023 A | 8/1999 | Young |
| 6,201,406 B1 | 3/2001 | Iwanczuk et al. |
| 6,255,848 B1 | 7/2001 | Schultz et al. |
| 6,327,634 B1 | 12/2001 | Statovici |
| 6,351,814 B1 * | 2/2002 | Batinic et al. ............. 713/194 |
| 6,628,621 B1 * | 9/2003 | Appleton et al. ............. 370/249 |
| 6,748,020 B1 * | 6/2004 | Eifrig et al. ............. 375/240.26 |
| 2001/0032318 A1 * | 10/2001 | Yip et al. ............. 713/190 |
| 2002/0196939 A1 * | 12/2002 | Unger et al. ............. 380/216 |

OTHER PUBLICATIONS

"Virtex -II 1.5 V Field Programmable Gate Arrays" Nov. 29, 2001, available from Xilinx, Inc. located at 2100 Logic Drive, San Jose, CA 95124.

* cited by examiner

*Primary Examiner*—Gilberto Barrón, Jr.
*Assistant Examiner*—William S Powers
(74) *Attorney, Agent, or Firm*—Arthur J. Behiel; John J. King (57) ABSTRACT

Described are methods and circuits that allow encrypted and unencrypted, or differently encrypted, configuration data to define the contents of the same physical memory frame or frames within a programmable logic device.

37 Claims, 5 Drawing Sheets

METHODS AND CIRCUITS FOR ALLOWING ENCRYPTED AND UNENCRYPTED CONFIGURATION DATA TO SHARE CONFIGURATION FRAMES

BACKGROUND

A PLD (programmable logic device) is an integrated circuit that performs digital logic functions selected by a designer. PLDs include logic blocks and interconnect lines, and typically both the logic blocks and interconnect lines are programmable. One common type of PLD is an FPGA (field programmable gate array), in which the logic blocks typically include lookup tables and flip-flops that generate and store any logic function of their input signals. Another type of PLD is the CPLD (complex programmable logic device), in which the logic blocks perform the AND function and the OR function and the selection of input signals is programmable.

Designs implemented in PLDs have become so complex that they often take months to complete and debug. When a design is going into a system of which the PLD is a part and is to be sold for profit, the designer does not want the result of this design effort to be copied by someone else. The designer often wants to keep the design a trade secret.

Many PLDs, particularly FPGAs, use volatile configuration memory that must be loaded from an external device such as a PROM every time the PLD is powered up. Since configuration data is stored external to the PLD and must be transmitted through a configuration access port, the privacy of the design can easily be violated by an attacker who monitors the data on the configuration access port, e.g. by probing board traces.

A number of companies address this security problem by encrypting configuration data stored off chip. Xilinx, Inc., is one such company. Their Virtex-II™ line of FPGAs provides design security through bitstream encryption. Bitstreams are encrypted for storage using a secure triple Data Encryption Standard (DES) algorithm. The requisite decryption key is supplied to the FPGA through the IEEE 1149.1 JTAG interface for storage on-chip in non-volatile memory. The FPGA can then receive and decrypt the encrypted bitstream using the stored key.

In the Virtex-II™ encryption method, all configuration data within a given bitstream is encrypted. This provides adequate security for many applications, but can expose designs to some threats. For example, a logic designer may design an application-specific portion of a circuit to be instantiated on an FPGA and purchase a core design separately from an intellectual property (IP) vendor to provide additional functionality. The IP vendor will be interested in maintaining the core design secret from the logic designer; however, using the same encryption algorithm and key to encrypt both the core design and the application-specific portion presents the logic designer an opportunity to reverse the encryption process using the known portion and the resulting encryption. There is consequently a need for a way for IP vendors to better protect their designs.

For a more detailed discussion of configuration-data encryption, see U.S. patent application Ser. No. 10/112,790, filed Mar. 29, 2002 and entitled "METHODS AND CIRCUITS FOR PROTECTING PROPRIETARY CONFIGURATION DATA FOR PROGRAMMABLE LOGIC DEVICES," by Stephen M. Trimberger, which is incorporated herein by reference.

SUMMARY

The present invention addresses the need of IP vendors to better protect their designs. In accordance with one embodiment, encrypted core data can be interleaved with encrypted or unencrypted application-specific data in such a way that the application-specific and core data can share physical memory frames.

To begin with, a programmable logic device (PLD) is logically partitioned. A first portion of the PLD is allocated to encrypted designs. This portion includes all the configuration bits associated with logic functionality in a selected region of the PLD and a subset of the configuration bits associated with routing in that region. The remaining resources (i.e., a "second portion" of the PLD), including what is left of the configuration bits associated with routing in the first region, are then available to the logic designer for instantiating application-specific designs.

Constrained to their respective portions of programmable resources, the logic designer and IP vendor separately develop their respective application-specific and core designs to produce application-specific and core sub-designs. These sub-designs are then expressed as application-specific and core sub-bitstreams, respectively. The IP vendor can then encrypt his or her sub-bitstream for delivery to the logic designer. The logic designer's software then assembles the application-specific and encrypted core data into a single bitstream representing the complete design to be instantiated on the PLD.

A PLD in accordance with the invention is adapted to configure itself using the bitstream representing the complete design. The PLD includes a selective decryptor that loads the unencrypted portions from the complete design directly into a frame buffer and decrypts the encrypted core design before loading the resulting decrypted configuration data into the same frame buffer. The PLD thus enables encrypted and unencrypted configuration data to control programmable circuitry associated with a single physical memory frame.

In another embodiment, the application-specific and core designs are specified using partial frames with the same number of words as a full frame. In the application-specific frames, those words allocated to core data are "stuffed" with zeros, and in the core frames, those words allocated to application-specific data are stuffed with zeros. Stuffing the partial frames with zeros simplifies the interleaving process. The application-specific and core data are combined by simply ORing the application-specific and core partial frames. Because the stuffed zeros have no effect on the output of the OR function, the resulting composite data frames comprise interleaved core and application-specific data.

A PLD in accordance with another embodiment includes a non-volatile array of configuration-data memory that can be loaded with proprietary configuration data before the PLD is delivered to a customer (the "end user"). In some embodiments, the data in the non-volatile memory can be used to decrypt proprietary configuration data delivered to the PLD from some external source. In one such embodiment, for example, XORing design data off chip with the configuration data stored (or to be stored) in the non-volatile memory produces an encrypted version of the design data. The encrypted version of the design data can then be delivered to the PLD and XORed again with the contents of the non-volatile memory to restore the design data to its original form. The resulting decrypted frames are then used to configure the PLD. In another embodiment, the configuration process combines design data, conveyed to the PLD via an external source, and the proprietary configuration data in non-volatile memory to instantiate a logic circuit on the PLD. The proprietary design can be a default design that loads automatically in the absence of externally provided data.

This summary is not intended to limit the invention, which is instead defined by the claims.

DETAILED DESCRIPTION

Figure 1:
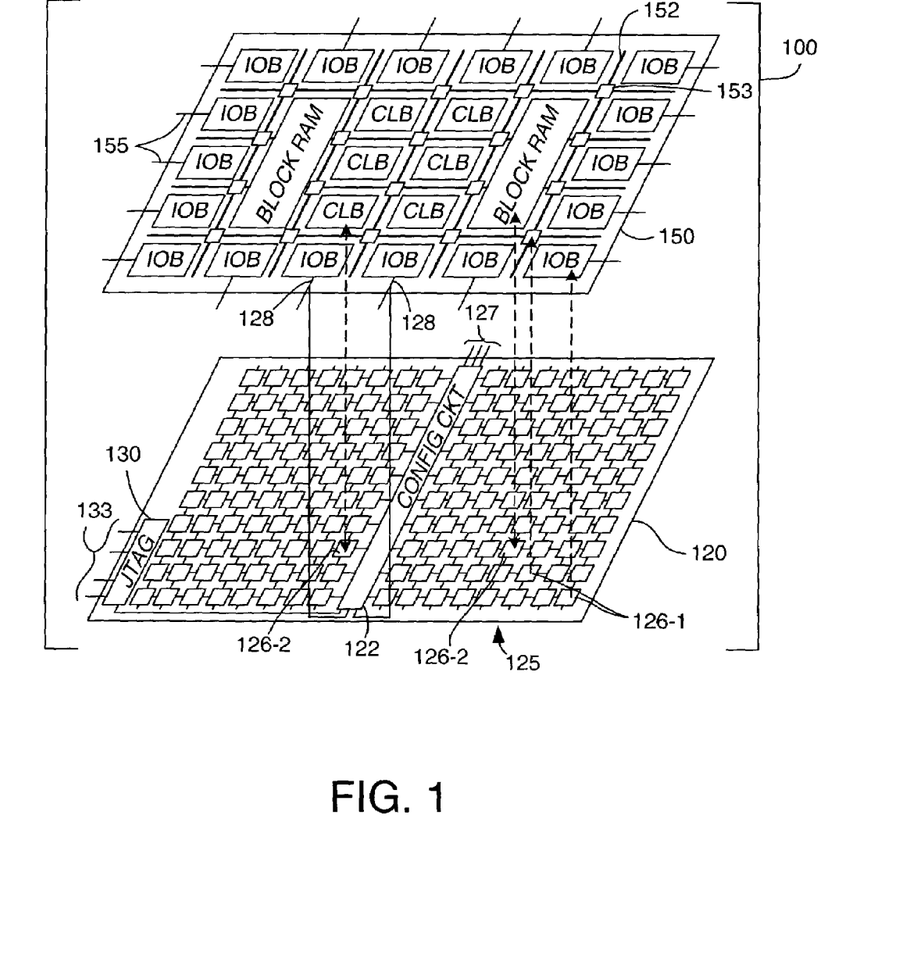
FIG. 1 is a split-level perspective view showing a simplified representation of an FPGA 100 modified in accordance with the invention.

FIG. 1 is a split-level perspective view showing a simplified representation of an FPGA 100 modified in accordance with an embodiment of the invention to allow encrypted and non-encrypted configuration data to occupy the same physical memory frame. FPGA 100 is similar to those available from Xilinx, Inc., of San Jose, Calif. To simplify the following description, FPGA 100 is functionally separated into a configuration plane 120 and a logic plane 150. Other simplifications and functional representations facilitate the following description.

Configuration plane 120 generally includes a configuration circuit 122 and configuration memory array 125. Configuration circuit 122 includes several input and/or output terminals that are connected to dedicated configuration pins 127 and to dual-purpose input/output (I/O) pins 128. Configuration memory array 125 includes memory cells 126-1 and 126-2 arranged in "frames," which in this example are columns of static, random-access memory (SRAM) cells extending the length of FPGA 100. Configuration memory array 125 additionally includes addressing circuitry (not shown) for accessing each frame.

JTAG (Boundary Scan) circuitry 130 is included in configuration plane 120, and is also connected to at least one terminal of configuration circuit 122. JTAG circuit 130 includes the four well-known JTAG terminals 133 (i.e., TDI, TDO, TMS, and TCK). During configuration of FPGA 100, configuration control signals are transmitted from dedicated configuration pins 127 to configuration circuit 122. In addition, a configuration bitstream is transmitted from either the TDI terminal of JTAG circuit 130 or from dual-purpose I/O pins 128 to configuration circuit 122. During a configuration operation, circuit 122 routes configuration data from the bitstream to memory array 125 to establish an operating state of FPGA 100. Circuit 122 is described in additional detail below.

Programmable logic plane 150 includes CLBs arranged in rows and columns, IOBs surrounding the CLBs, and programmable interconnect resources including interconnect lines 152 (indicated by heavy black lines) and multi-way switch boxes 153 (indicated by rectangles) that are connected between the rows and columns of CLBs. During normal operation of FPGA 100, logic signals are transmitted from dual-purpose pins 128 and/or device I/O pins 155 through the IOBs to the interconnect resources, which in turn route these signals to the CLBs in accordance with the configuration data stored in memory array 125. The CLBs perform logic operations on these signals in accordance with the configuration data stored in memory array 125 and transmit the results of these logic operations to dual-purpose pins 128 and/or device I/O pins 155. In addition to the CLBs, programmable logic plane 150 includes dedicated random-access memory blocks (BLOCK RAM) that are selectively accessed through the IOBs and interconnect resources. Other programmable logic plane resources, such as clock resources, are omitted from FIG. 1 for brevity.

Figure 2A:
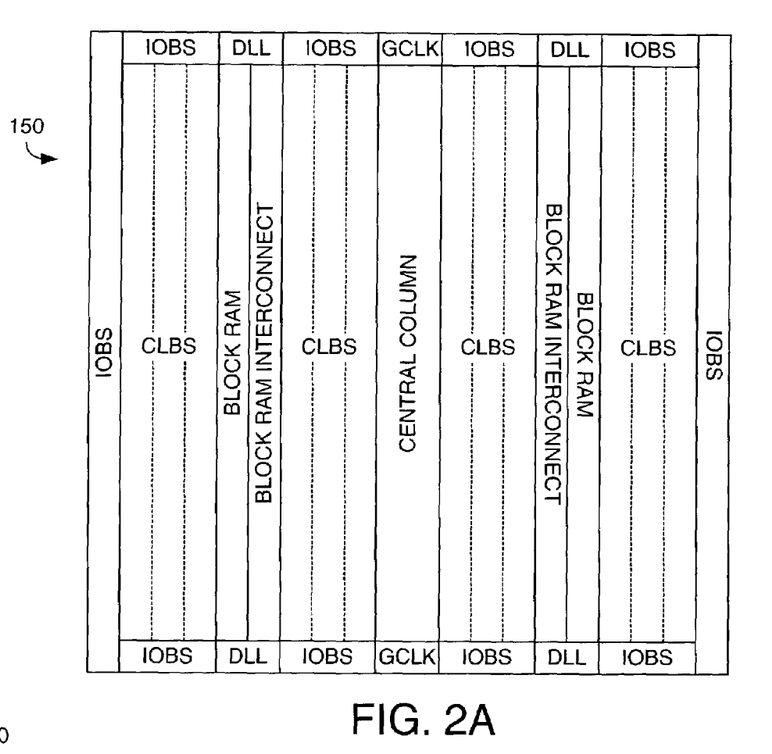
FIG. 2A is a plan view showing additional detail regarding the arrangement of the CLBs, IOBs, and Block RAMs in logic plane 150 of an FPGA 100.

FIG. 2A is a plan view showing additional detail regarding the arrangement of the CLBs, IOBs, and Block RAMs in logic plane 150 of FPGA 100 (see FIG. 1). The CLBs, IOBs, and Block RAMs of logic plane 150 are organized as rectangular arrays on opposing sides of a central column, which includes global clock circuitry (GCLK) and portions of configuration circuit 122 (shown in FIG. 1). The CLBs, IOBs and Block RAMs are organized into columns to facilitate configuration. For convenience, the interconnect resources are considered part of the CLB columns, and are therefore not shown in FIG. 2A. Each CLB column includes two IOBs at its upper end and two IOBs at its lower end. IOB columns are located on the left and right sides of the CLB columns. On the left and right edges of the IOB columns are Block RAM columns and Block RAM interconnect columns, each including delay-lock loop (DLL) circuitry at respective upper and lower ends. Global clock (GCLK) circuitry is provided at the upper and lower ends of the central column.

Figure 2B:
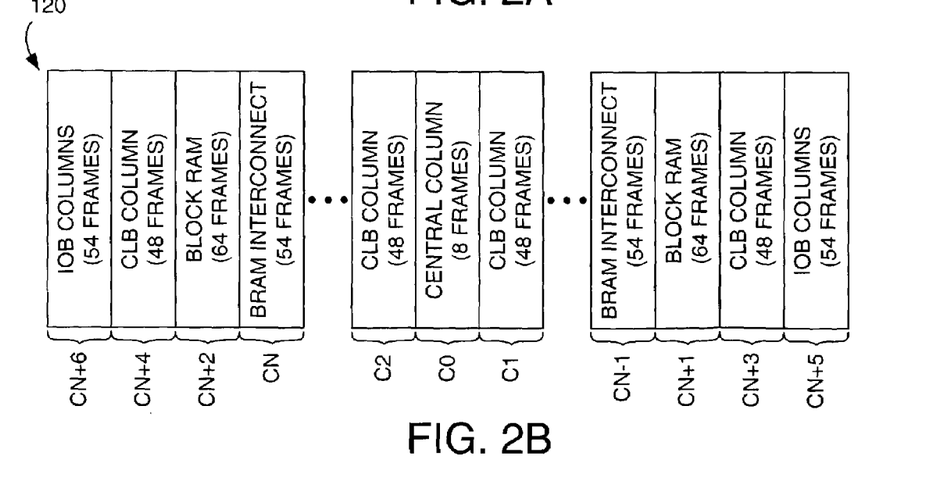
FIG. 2B illustrates the numbers of frames associated with the CLB, IOB, Block RAM, Block RAM interconnect, and central columns of an FPGA.

Configuration memory cells 126-1 and 126-2 of configuration plane 120 are arranged in vertical frames that extend the length (e.g., top to bottom) of the CLB, IOB, Block RAM, and central columns of FPGA 100. Multiple frames control each CLB, IOB, Block RAM, and central column of FPGA 100. For example, FIG. 2B illustrates the numbers of frames associated with the CLB, IOB, Block RAM, Block RAM interconnect, and central columns of an exemplary FPGA. Each CLB column includes 48 frames, each IOB column includes 54 frames, each Block RAM column includes 64 frames, each Block RAM interconnect column includes 54 frames, and the central column includes 8 frames. Of course, the number of frames in each column may differ from the numbers indicated in FIG. 2B.

Each frame of configuration memory cells is addressed by a major address and a minor address. The major address indicates the column in which the frame is located, and the minor address indicates the frame associated with each major address. As indicated in FIG. 2B, the major addresses for the frames in Virtex-II™ FPGAs alternate between the left and right sides of the chip. For example, major address C0 (which is associated with the central column) is located in the center of the chip. Major address C1 references the CLB column that lies to the right of the central column, major address C2 references the CLB column that lies to the left of the central column, and so on, until the IOB and Block RAM columns CN+1 to CN+6. The minor address identifies a particular frame within a major address. As set forth in detail below, by addressing each frame individually it is possible to access (i.e. read or write) multiple consecutive frames with a single command by designating a starting frame and accessing consecutive frames in an ascending or descending order, thereby facilitating partial reconfiguration. Further, an individual frame can be accessed with a single command, thereby facilitating the use of semaphores, which are described in U.S. Pat. No. 6,255,848, to Schultz et al., which is incorporated herein by reference. Moreover, by storing, for example, the frame addresses for all CLBs of FPGA 100, it is possible to reconfigure all of the CLBs using a single command (i.e., without addressing the CLB frames individually, and without addressing the frames associated with the IOBs, interconnect resources, and Block RAMs).

The size (i.e., the number of memory cells) of each frame depends, for example, on the number of CLB rows of a particular FPGA. In one embodiment, the number of configuration memory cells in each CLB frame is calculated by multiplying the number of CLB rows by the number of memory cells in each row (e.g., 18), and then adding two additional sets of memory cells for the IOBs located above and below the CLBs. The sequence of bits in each frame is arranged in a consistent manner. For example, the first 18 bits of a CLB frame control the two IOBs at the top of the column, subsequent sets of 18 bits are then allocated for each CLB row, and the last 18 bits control the two IOBs at the bottom of the CLB column.

Figure 3:
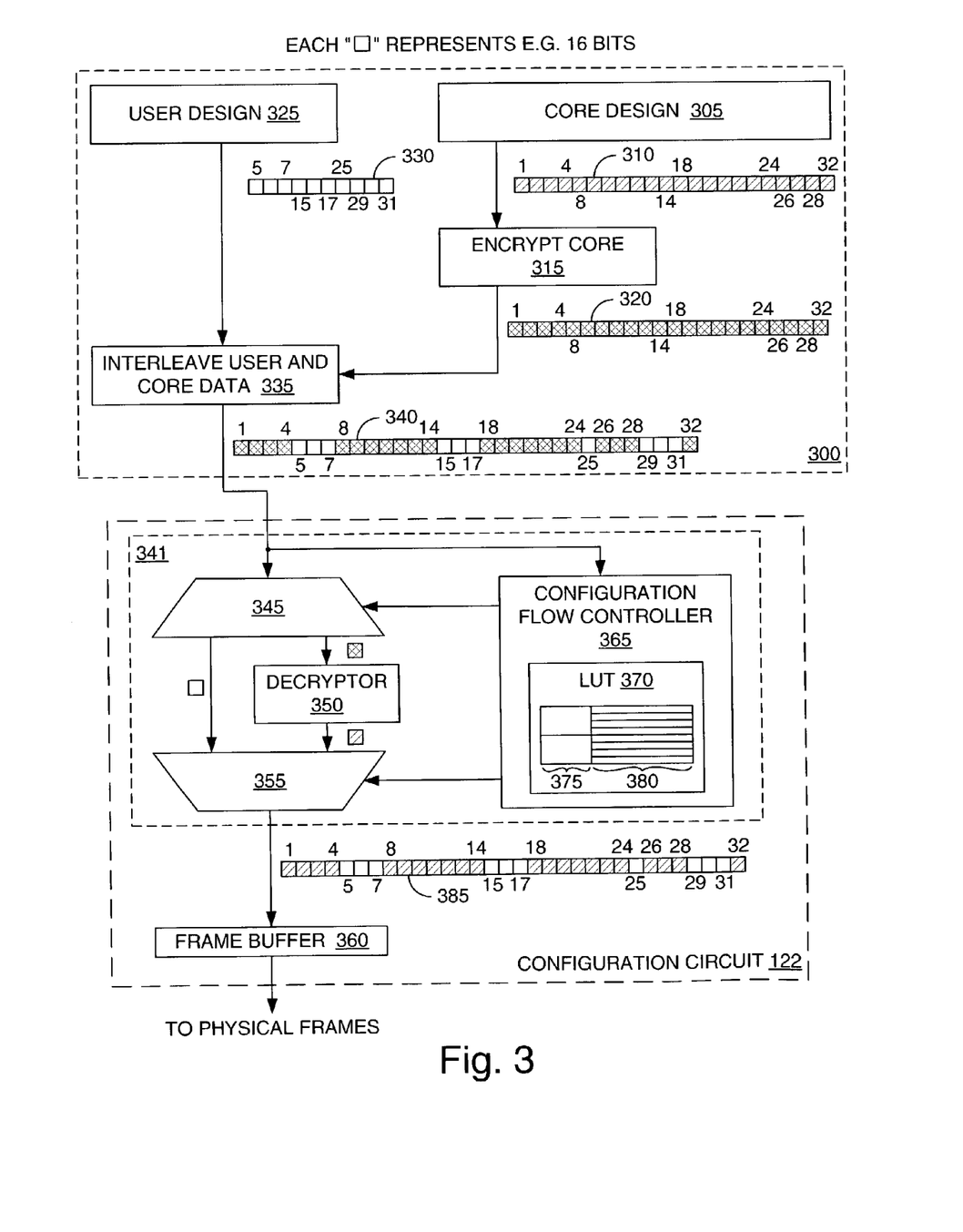
FIG. 3 includes a block diagram of configuration circuit 122 and a flowchart 300 that together illustrate how frames are adapted to receive encrypted and non-encrypted data in accordance with an embodiment of the invention.

FIG. 3 includes a block diagram of configuration circuit 122 and a flowchart 300 that together illustrate how frames are adapted to receive encrypted and non-encrypted data in accordance with an embodiment of the invention.

To begin with, FPGA 100 is logically partitioned. A first portion of FPGA 100 is allocated to encrypted designs. The first portion includes all the configuration bits associated with logic functionality in a selected region of FPGA 100 and a subset of the configuration bits associated with routing in that region. Some or all of the remaining resources (i.e., a "second portion"), including what is left of the configuration bits associated with routing in the first region, are then available to the logic designer. The first portion includes the bits that control connections between the two portions. In accordance with one embodiment, the two portions can share frames.

The above-described partitioning is not physical, but is instead accomplished in software. IP vendors are provided with design software that limits their core designs to logic and interconnect resources within the first portion; software available to logic designers limits their designs (referred to herein as "application-specific designs") to the second portion. The terms "application-specific" and "core" are used in specific examples to distinguish between two differently treated portions of a complete design. In practice, core designs may be considered "application-specific," and logic designers may develop what they consider to be "core" designs. Moreover, a single PLD configuration may include more than two designs, or more than two portions of designs.

Flowchart 300 illustrates the creation of a single configuration-data frame shared by application-specific and core configuration data. In this example, words 1–4, 8–14, 18–24, 26–28, and 32 are allocated to core configuration data, and the remaining words 5–7, 15–17, 25, and 29–31 are allocated to application-specific configuration data. Other frames will typically be allocated to application-specific data, core data, or both.

Constrained to resources in the first portion, the IP vendor develops a proprietary core defined by core configuration data (step 305). The core software provides a bitstream including a partial frame 310 where a portion of a frame allocated to both application-specific and core logic defines the functionality of the allocated resource (e.g., routing). Partial frame 310 is then encrypted using any of a number of conventional encryption techniques (step 315), resulting in an encrypted partial frame 320. For a detailed discussion of a number of appropriate encryption techniques, see U.S. patent application Ser. No. 09/724,652 entitled "PROGRAMMABLE LOGIC DEVICE WITH DECRYPTION ALGORITHM AND DECRYPTION KEY," by Raymond C. Pang, et al., which is incorporated herein by reference.

Constrained to resources in the second portion, the logic designer develops application-specific logic defined by application-specific configuration data and expressed as a bitstream (step 325). Because, in the example, a shared frame defines the allocated resource, the application-specific bitstream includes a partial frame 330 that complements partial frame 310. The logic designer's software then accepts the encrypted proprietary core, including partial frame 320, and interleaves the application-specific and core configuration bitstreams to create a comprehensive configuration bitstream that defines both the application-specific and core designs (step 335). This interleaving produces a composite data frame 340 that includes both the encrypted partial frame 320 encrypted in step 315 and the never-encrypted partial frame 330. The entire configuration bitstream, including composite data frame 340, is then available to configure FPGA 100.

As noted above in relation to FIG. 1, FPGA 100 receives configuration data via configuration circuit 122. FIG. 3 details a portion of configuration circuit 122 adapted in accordance with the invention to load configuration plane 120 with configuration data from configuration data frames that, like composite data frame 340, include encrypted and unencrypted data.

Configuration circuit 122 includes a selective decryptor 341, which in turn includes a demultiplexer 345, a decryptor 350, a multiplexer 355, and a configuration flow controller 365. Flow controller 365 includes a look-up-table (LUT) 370 (e.g., a read-only memory), which in turn includes a collection of partition-type fields 375, each of which is associated with a collection of frame-type fields 380. As detailed below, selective decryptor 341 defines a pair of data paths, one of which employs decryptor 350 to decrypt encrypted configuration data, the other of which conveys unencrypted data unaltered into a frame buffer 360. Configuration circuit 122 includes other components necessary to configure FPGA 100, as described in the above-incorporated patent to Schultz et al.

Figure 4:
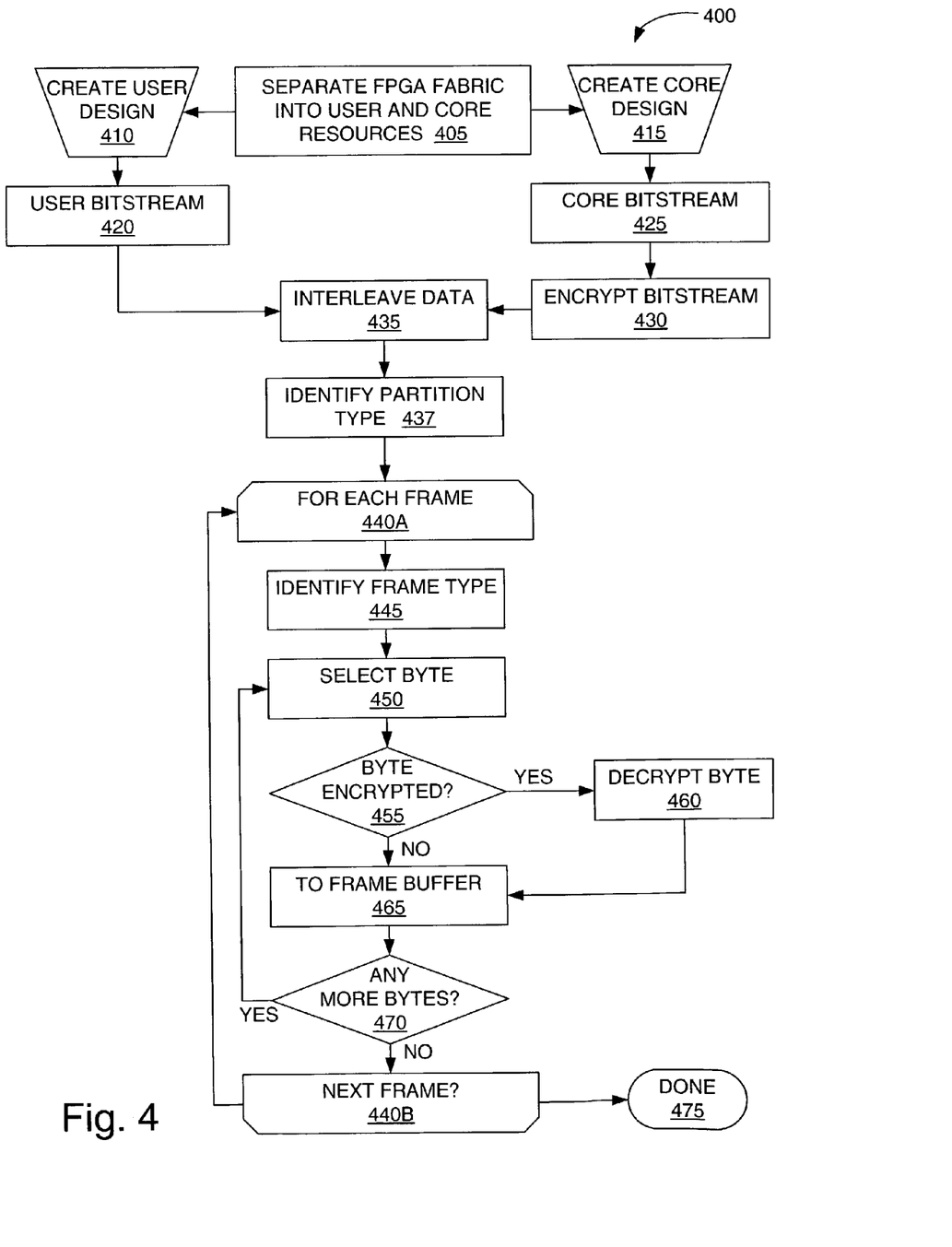
FIG. 4 depicts a flowchart 400 describing the process of developing and merging separate application-specific and core configuration data and then using the resulting combined configuration data to configure an FPGA.

FIG. 4 depicts a flowchart 400 describing the process of developing and merging application-specific and core configuration data and then using the resulting combined configuration data to configure an FPGA. A portion of flowchart 400 is similar to flowchart 300 of FIG. 3, except that flowchart 400 addresses the creation of multiple frames of configuration data.

First, FPGA 100 is logically partitioned as discussed above (step 405). Constrained to their respective portions of programmable resources, the logic designer and IP vendor separately develop the application-specific and core designs (steps 410 and 415). The respective designs are then conventionally assembled into respective application-specific and core bitstreams (steps 420 and 425). The core bitstream is then encrypted (step 430), and the resulting encrypted partial bitstream is interleaved with the application-specific partial bitstream (step 435) to create a bitstream representing the complete design to be instantiated on FPGA 100.

The bitstream from step 435 is conveyed to configuration circuit 122 of FIG. 3. The steps following step 435 describe the function of configuration circuit 122, and are consequently described in connection with circuit 122 as depicted in FIG. 3.

In step 437, configuration circuit 122 uses the bitstream header to identify the manner in which the data is partitioned. That is, the header indicates which portions of which frames are dedicated to application-specific configuration data and which are dedicated to core configuration data. The header includes a field with a partition identifier that corresponds to a value in one of partition-type fields 375 in LUT 370. Different cores may require different amounts of resources, so some embodiments allow IP vendors a greater portion of the available FPGA resources. There are two potential partition types in the example, but there may be more or fewer.

Step 440A begins a loop that repeats for each frame. As described in connection with FIGS. 2A and 2B, there are several types of physical memory frames, the different types having different formats. In accordance with the embodiment of FIG. 3, different frames and/or different frame types can be treated differently. Configuration circuit 122 determines how a given frame is to be treated (e.g., determines which words to decrypt) using values in frame-type field 380 of look-up table 370 (step 445). If, for example, frame number one is selected for loading, configuration circuit 122 checks frame-type field 380 to determine which, if any, of the words within frame number one are to be decrypted. In the example, there are a number of identical frames of each of a number of types, so the information in field 380 is only provided for frame types; however, other embodiments might uniquely identify the treatment for each frame, or even portions of frames.

With the frame type identified, configuration circuit 122 selects the first byte of the frame being loaded (step 450). Using the information in frame-type field 380, configuration circuit 122 determines whether the first byte of the frame is to be decrypted (decision 455); if so, configuration flow controller 365 causes demultiplexer 345 and multiplexer 355 to send the encrypted byte to frame buffer 360 via decryptor 350 (steps 460 and 465). If, on the other hand, the byte need not be decrypted, configuration flow controller 365 causes demultiplexer 345 and multiplexer 355 to send the byte directly to frame buffer 360. Each successive byte within the frame is treated to the same process (decision 470) until all bytes within the frame have been moved into frame buffer 360. Configuration circuit 122 thus decrypts only the encrypted portions of partially encrypted data frame 340 to produce a full, unencrypted configuration data frame 385 within frame buffer 360.

With no more bytes to load from the selected frame, the process moves to the next frame (step 440B). At or near the same time, configuration circuit 122 moves the contents of the filled frame buffer 360 into the appropriate physical memory frame. The "for" loop defined between steps 440A and 440B continues until all frames within the bitstream have been loaded into the physical memory frames of configuration memory array 125 (step 475).

FIGS. 3 and 4 illustrate an example in which a bitstream includes a set of encrypted data interleaved with a set of unencrypted data. Configuration circuit 122 can also be configured to bypass decryptor 350 entirely or to send all data through decryptor 350. In other embodiments, configuration circuit 122 is adapted to interleave combinations of two or more encrypted or unencrypted sub-designs. Moreover, the interleaving can vary in granularity (e.g., bit-by-bit or frame-by-frame).

Figure 5:
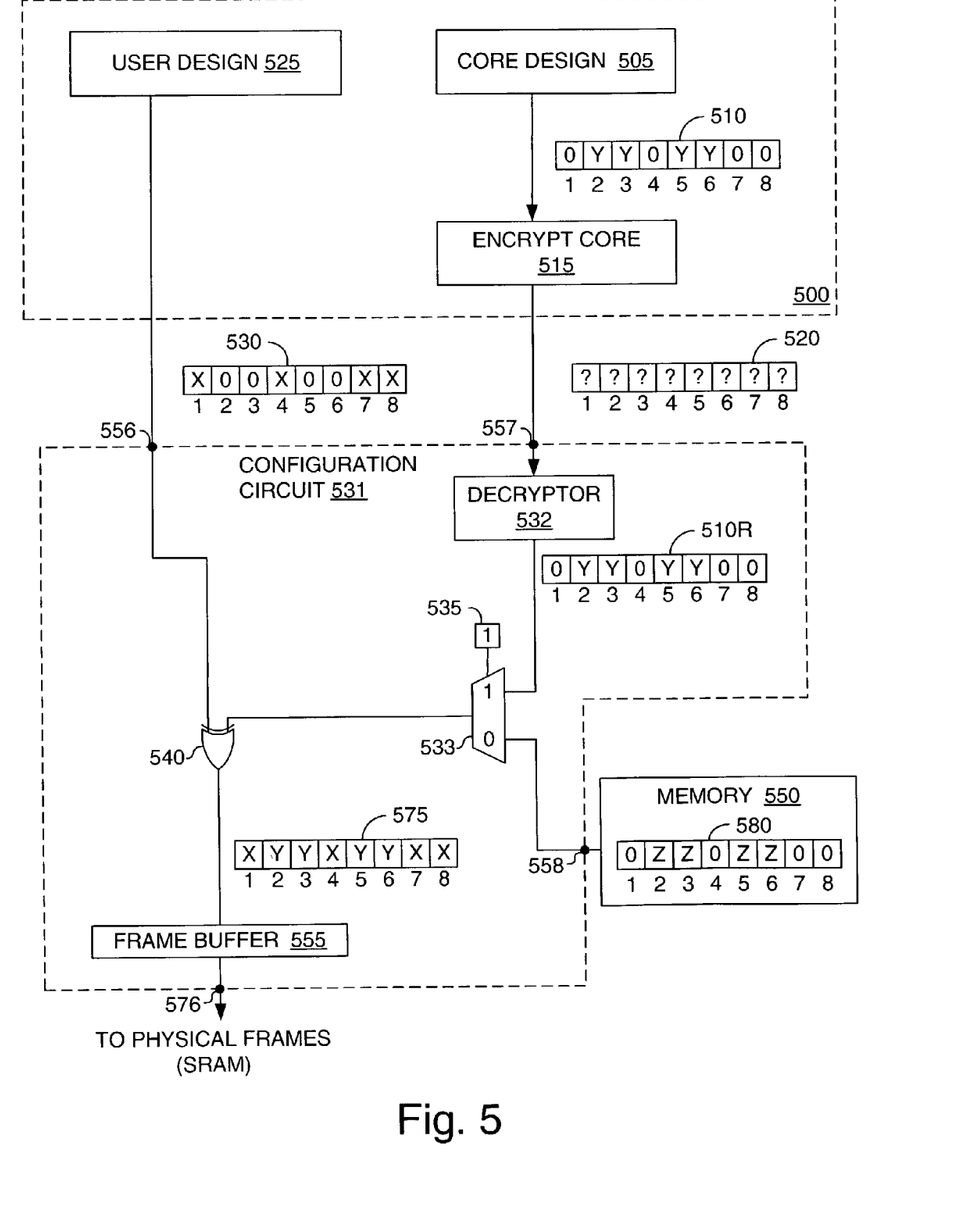
FIG. 5 includes a block diagram of an embodiment of a configuration circuit 531 and a flowchart 500 that together illustrate how frames are adapted to receive encrypted and non-encrypted data in accordance with some embodiments of the invention.

FIG. 5 includes a block diagram of an embodiment of configuration circuit 122, here labeled 531, and a flowchart 500 that together illustrate how frames are adapted to receive encrypted and non-encrypted data in accordance with some embodiments of the invention.

As in the example of FIG. 3, FPGA 100 is first logically partitioned. A first portion of FPGA 100 is allocated to encrypted designs. The first portion includes all the configuration bits associated with logic functionality in a selected region of FPGA 100 and a subset of the configuration bits associated with routing in that region. Some or all of the remaining resources (i.e., a "second portion"), including what is left of the configuration bits associated with routing in the first region, are then available to the logic designer. The first portion includes the bits that control connections between the two portions. In accordance with one embodiment, the two portions can share frames.

Flowchart 500 illustrates the creation of a single configuration-data frame shared by application-specific and core configuration data. In this example, words 2, 3, 5, and 6 of an exemplary eight-word configuration data frame are allocated to core configuration data, and the remaining words 1, 4, 7, and 8 are allocated to application-specific configuration data. Other frames will typically be allocated to application-specific data, core data, or both.

Constrained to resources in the first portion, the IP vendor develops a proprietary core defined by core configuration data (step 505). The core software provides a partial frame 510 with the same number of words as a full frame (e.g., eight), but in which those words allocated to application-specific data are "stuffed" with zeros. In the example, data letters "Y" indicate words of the core design, and may include zeroes, ones, or both. Partial frame 510, which in this case is assumed to include proprietary configuration data, is then encrypted (step 515), resulting in an encrypted partial frame 520. Each encrypted word in partial frame 520 is identified as a question mark.

Constrained to resources in the second portion, the logic designer develops application-specific logic defined by application-specific configuration data (step 525). Because, in the example, a shared frame defines the allocated resource, the logic designer's software provides a partial frame 530 that complements partial frame 510. That is, partial frame 530 is stuffed with zeros in the words allocated to data in partial frame 510. In the example, data letters "X" indicate words of the application-specific design, and may include zeroes, ones, or both. The collection of application-specific configuration data, including partial frame 530, is typically stored in an external configuration data source (e.g., an EPROM).

The embodiment of FIG. 5 includes a configuration circuit 531 that differs from the above-described configuration circuit 122. Configuration circuit 531 includes a conventional decryptor 532, a programmable multiplexer 533 controlled by a configuration memory cell 535, an exclusive OR (XOR) gate 540, and a frame buffer 555. Configuration circuit 531 receives partial frames 530 and 520 via respective configuration-data input ports 556 and 557. A bank of non-volatile configuration-data memory 550 connects to configuration circuit 531 via another configuration-data input port 558. Memory 550 is not to be confused with configuration memory array 125: memory 550 is non-volatile memory that does not control programmable elements directly, but instead stores a collection of configuration data.

Partial frame 530 and encrypted partial frame 520 are presented to configuration circuit 531 on separate device input pins (not shown) of a single configuration access port. Decryptor 532 then decrypts encrypted partial frame 520 to restore partial frame 510. The restored partial frame 510R is identical to partial frame 510.

Memory element 535 connects to the select terminal of multiplexer 533. In one embodiment, memory element 535 is a register set by the configuration bitstream based on the type of configuration used. In this example, element 535 is set to a logic one, causing multiplexer 533 to convey recovered partial frame 510R to an input of XOR gate 540.

XOR gate 540 "XORs" partial frames 510R and 530, bit-by-bit or word-by-word. Because the stuffed zeros have no effect on the output of XOR gate 540, the resulting composite data frame 575 is an interleaved combination of recovered partial data frame 510R and partial data frame 530. Composite data frame 575 is then conveyed to the appropriate physical frame via frame buffer 555 and a configuration-circuit output port 576. In an alternative embodiment, partial data frames 520 and 530 are loaded sequentially into configuration circuit 531 on a signal device pin and are then separated.

In the depicted embodiment, proprietary configuration data can be loaded into memory 550 before the PLD is delivered to a logic designer or end user. In an embodiment in which memory element 535 is non-volatile memory, memory element 535 can be loaded with a logic zero at the same time. The logic designer or end user would thus receive a device in which one input of XOR gate 540 connects via multiplexer 533 to an output of memory 550.

In the example, memory 550 includes a partial frame 580 with zeroes stuffed in the 1, 4, 7, and 8 places. When memory 550 presents partial frame 580 to XOR gate 540, XOR gate 540 ignores the stuffed zeros, and consequently provides a composite frame (not shown) including partial frames 530 and 580 to frame buffer 555.

In another embodiment, memory 550 can be programmed to include a "default" design for the PLD. Such a design might be, for example, some sort of test circuit that verifies some portion of the PLD's resources. Configuring the PLD with a constant zero applied to port 556 and a logic zero stored in memory element 570 would then cause the configuration data in memory 550 to load, frame-by-frame, into frame buffer 555. The FPGA would thus be configured to instantiate a logic design specified by configuration data in memory 550.

Because the words in partial frame 530 that are allocated to partial frame 510R are stuffed with zeros, and vice versa, XOR gate 540 can be replaced with an OR gate. However, XOR gate 540 supports some additional functionality. For example, logic designers privy to the default configuration data in memory 550 can XOR the default configuration data with some application-specific data specifying a desired application-specific design. (Stated mathematically, the logic designer performs a modulo-two sum of the two configuration data streams.) XOR gate 540 would then XOR the application-specific data with the contents of memory 550 to restore the application-specific data to its original form. Using configuration circuit 531, memory element 535 would first be loaded with a logic zero. Next, the application-specific design would be XORed on-chip with the contents of memory 550 (i.e., configuration circuit 531 performs a modulo-two difference of the encrypted application-specific design and the contents of memory 550). The resulting frames would then be conveyed to the appropriate physical frame via buffer 555.

The default configuration data in memory 550, if maintained secret, supports the use of encrypted configuration data without relying upon a separate decryptor circuit such as decryptor 532. Memory 550 can be loaded with a default configuration known only to the logic designer. Before conveying the application-specific data to the PLD, the logic designer can then encrypt the application-specific data by XORing the known default configuration data with the application-specific data. XOR gate 540 would then XOR the encrypted version of the application-specific data with the contents of memory 550 to restore the application-specific data to its original form. The resulting decrypted frames would then be conveyed to the appropriate physical frame via buffer 555. For decryption, memory 550 can be loaded with random data or some default configuration data.

In one embodiment, memory 550 is large enough to include a complete set of configuration data for the PLD. In embodiments in which memory 550 is smaller than the configuration memory, the contents to memory 550 can be repeatedly XORed with successive portions of the encrypted configuration data. For example, if memory 550 is one-fourth the size of the configuration memory, then the contents of memory 550 can be XORed with each quarter of the encrypted configuration data. Those of skill in the art will readily understand that the XOR function can easily be replaced with an XNOR function.

Configuration circuit 531 supports a number of security features that may be unnecessary for some applications. For example, embodiments in which encrypted configuration data is decrypted by XORing that data with the contents of memory 550 do not require decryptor 532, multiplexer 533, and memory cell 535. Configuration circuit 531 can be modified, as desired, to support one or more of the methods disclosed herein to protect proprietary data.

The above description details a few embodiments. However, many additional embodiments are also possible. By way of example:

1. partial frames 310 and 330 of FIG. 3 can be passed to circuit 122 using separate inputs, eliminating the need for demultiplexer 345; and
2. core design 305 need not be encrypted, but might be secured, for example, by storing core design 305 in non-volatile memory on chip.

These and other obvious variations are within the scope of the invention.

What is claimed is:

1. A programmable logic device comprising:
   an array of configuration memory, the array including a plurality of physical memory frames;
   a frame buffer connected to the physical memory frames and adapted to store a series of configuration data frames in corresponding ones of the physical memory frames;
   a configuration access port adapted to receive composite data frames, each composite data frame including at least one encrypted configuration data bit associated with a first sub-design comprising a proprietary portion and at least one unencrypted configuration data bit associated with a second sub-design comprising an application specific portion; and a selective decryptor having an input node connected to the configuration access port and an output node connected to the frame buffer, wherein the selective decryptor is adapted to decrypt the encrypted configuration data bit to create a decrypted configuration data bit and to convey the unencrypted configuration data bit and the decrypted configuration data bit to the frame buffer.

2. The programmable logic device of claim 1, the selective decryptor further comprising a demultiplexer having a demultiplexer input terminal connected to the configuration access port, a demultiplexer control terminal, and first and second demultiplexer output nodes.

3. The programmable logic device of claim 2, the selective decryptor further comprising a decryptor having a decryptor input terminal and a decryptor output terminal, wherein the decryptor input terminal connects to the second demultiplexer output node.

4. The programmable logic device of claim 2, the selective decryptor further comprising a configuration flow controller having an output terminal connected to the demultiplexer control terminal, wherein the configuration flow controller provides a first signal to the demultiplexer control terminal to convey the non-encrypted configuration data to the first demultiplexer output node and provides a second signal to the demultiplexer control terminal to convey the encrypted configuration data to the second demultiplexer output node.

5. The programmable logic device of claim 4, the selective decryptor further comprising a decryptor having a decryptor input terminal, connected to the second demultiplexer output node, and a decryptor output terminal.

6. The programmable logic device of claim 5, the selective decryptor further comprising a multiplexer having a first multiplexer input terminal connected to the first demultiplexer output node, a second multiplexer input terminal connected to the decryptor output terminal, and a multiplexer output terminal connected to the frame buffer via the selective-decryptor output node.

7. The programmable logic device of claim 1, wherein the configuration access port is adapted to receive a frame-identifier with at least one of the composite data frames, and wherein the selective decryptor circuit further comprises a register adapted to store the frame identifier.

8. The programmable logic device of claim 7, wherein the selective decryptor includes a memory identifying which bit in each composite data frame is the encrypted configuration data bit and which bit in each composite data frame is the unencrypted configuration data bit.

9. A programmable logic device comprising:
an array of configuration memory, the array including a plurality of physical memory frames;
a configuration access port adapted to receive at least one composite data frame, the composite data frame including a first plurality of configuration data bits associated with a first sub-design comprising a proprietary portion and a second plurality of configuration data bits associated with a second sub-design comprising an application specific portion; and
a selective decryptor having an input node connected to the configuration access port and an output node connected to the memory array, wherein the selective decryptor is adapted to decrypt the first plurality of configuration data bits to create decrypted configuration data bits.

10. The programmable logic device of claim 9, wherein the second plurality of configuration data bits are unencrypted.

11. The programmable logic device of claim 9, wherein the selective decryptor further comprises:
a first data path adapted to decrypt the first plurality of data bits and to convey the resulting decrypted data bits to the memory array; and
a second data path adapted to convey the second plurality of data bits to the memory array.

12. The programmable logic device of claim 11, wherein the second plurality of data bits are unencrypted.

13. The programmable logic device of claim 9, wherein the selective decryptor interleaves the decrypted configuration data bits with the second plurality of configuration data bits.

14. A programmable logic device comprising:
a configuration data port adapted to receive configuration data;
a selective decryptor having:
a decryptor input port connected to the configuration data port and adapted to receive the configuration data;
a first data path adapted to accept and decrypt a first portion of the configuration data associated with a first sub-design comprising a proprietary portion to provide a first sub-frame of configuration data; and
a second data path adapted to accept a second portion of the configuration data associated with a second sub-design comprising an application specific portion to provide a second sub-frame of configuration data; and
a first physical memory frame connected to the first and second data paths and adapted to receive the first and second sub-frames of configuration data.

15. The programmable logic device of claim 14, wherein the first data path is adapted to decrypt the first portion of the configuration data using a first key.

16. The programmable logic device of claim 15, wherein the configuration data comprises a configuration bit stream.

17. A method of protecting proprietary configuration data for defining the function of a programmable logic device, the method comprising:
encrypting the proprietary configuration data to create encrypted configuration data;
interleaving the encrypted configuration data and a second collection of configuration data to create a composite configuration data frame; and
conveying the composite configuration data frame to the programmable logic device.

18. The method of claim 17, further comprising decrypting, on the programmable logic device, the encrypted configuration data to create decrypted configuration data.

19. The method of claim 18, further comprising interleaving, on the programmable logic device, the decrypted configuration data and the second collection of configuration data.

20. The method of claim 17, wherein the second collection of configuration data is unencrypted.

21. A programmable logic device comprising:
a configuration access port adapted to receive a first collection of configuration data from an external configuration-data source;
a non-volatile array of configuration-data memory adapted to store a second collection of configuration data comprising a default design for the programmable logic device;

a configuration circuit having:
- a first configuration-data input port connected to the configuration access port and adapted to receive the first collection of configuration data;
- a second configuration-data input port connected to the non-volatile array of configuration-data memory and adapted to receive the second collection of configuration data; and
- a configuration-circuit output port; and an array of volatile configuration memory connected to the configuration-circuit output port;

wherein the configuration circuit is adapted to convey the first and second collections of configuration data into the volatile configuration memory.

22. The programmable logic device of claim 21, wherein the configuration circuit is adapted to interleave the first and second collections of configuration data.

23. The programmable logic device of claim 22, wherein the volatile configuration memory includes data frames, and wherein at least one of the data frames includes portions of the first and second collections of configuration data.

24. The programmable logic device of claim 21, wherein the volatile configuration memory comprises SRAM cells.

25. The programmable logic device of claim 21, wherein the configuration circuit further comprises a gate having a first gate input terminal connected to the first configuration-data input port and a second gate input terminal connected to the second configuration-data input port.

26. The programmable logic device of claim 25, wherein the gate performs an exclusive-OR function.

27. The programmable logic device of claim 21, wherein connecting the first configuration-data input port to a fixed logic level conveys only the second collection of configuration data into the volatile configuration memory.

28. A method of configuring a programmable logic device, the method comprising:
- storing a first collection of configuration data in non-volatile memory on the programmable logic device, wherein the first collection of configuration data comprises a default design;
- conveying a second collection of configuration data to the programmable logic device;
- moving the first and second collections of configuration data to volatile configuration memory in the programmable logic device; and
- testing resources of the programmable logic device using the default design.

29. The method of claim 28, further comprising interleaving the first and second collections of configuration data.

30. The method of claim 29, wherein the configuration memory comprises memory frames, the method further comprising storing portions of the first and second collections of configuration data in at least one of the frames.

31. A programmable logic device comprising:
- a configuration access port adapted to receive a collection of configuration data from an external configuration-data source;
- a non-volatile memory array adapted to store a second collection of data; and
- a configuration circuit having:
  - a configuration-data input port connected to the configuration access port and adapted to receive a collection of encrypted configuration data associated with a first sub-design comprising a proprietary portion;
  - a second input port connected to the non-volatile memory array and adapted to receive the second collection of data associated with a second sub-design comprising an application specific portion; and
  - a configuration-data output port;

wherein the configuration circuit is adapted to logically combine the encrypted collection of configuration data and the second collection of data and provide the resulting decrypted configuration data on the configuration-data output port.

32. The programmable logic device of claim 31, wherein the second collection of data comprises configuration data adapted to instantiate a logic circuit on the programmable logic device.

33. The programmable logic device of claim 31, wherein the configuration circuit performs an exclusive OR function of the encrypted collection of configuration data and the second collection of data to provide the decrypted configuration data.

34. The programmable logic device of claim 31, further comprising configuration memory, wherein the configuration memory and the non-volatile memory are of approximately equal capacity.

35. A method of protecting proprietary configuration data for a programmable logic device, the method comprising:
- performing a first modulo-two sum of the configuration data associated with a first sub-design comprising a proprietary portion and a second set of data associated with a second sub-design comprising an application specific portion to obtain encrypted configuration data;
- storing the second set of data on the programmable logic device;
- transferring the modulo-two sum to the programmable logic device; and
- performing, on the programmable logic device, a modulo-two difference of the encrypted configuration data and the second set of data to recover the configuration data.

36. The method of claim 35, wherein an exclusive-OR gate performs the modulo-two difference.

37. The method of claim 35, further comprising configuring the programmable logic device using the second set of data.

* * * * *